United States Patent
Agarwal et al.

(10) Patent No.: US 10,089,393 B2
(45) Date of Patent: Oct. 2, 2018

(54) SELECTING AND PRESENTING CONTENT RELEVANT TO USER INPUT

(71) Applicant: Google LLC, Mountain View, CA (US)

(72) Inventors: Ashish Agarwal, Sunnyvale, CA (US); Arash Baratloo, Mountain View, CA (US); Nicholas Chamandy, San Francisco, CA (US); Qicheng Ma, San Francisco, CA (US); Vivek Raghunathan, Fremont, CA (US); Chiu Wah Kelvin So, Mountain View, CA (US); Alice S. Tull, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/174,055

(22) Filed: Jun. 6, 2016

(65) Prior Publication Data

US 2017/0004210 A1 Jan. 5, 2017

Related U.S. Application Data

(63) Continuation of application No. 14/215,202, filed on Mar. 17, 2014, now Pat. No. 9,361,381, which is a
(Continued)

(51) Int. Cl.
*G06F 17/30* (2006.01)
*G06F 17/22* (2006.01)
(Continued)

(52) U.S. Cl.
CPC ...... *G06F 17/30864* (2013.01); *G06F 3/0482* (2013.01); *G06F 17/2247* (2013.01); *G06F 17/276* (2013.01); *G06F 17/3064* (2013.01)

(58) Field of Classification Search
None
See application file for complete search history.

(56) References Cited

U.S. PATENT DOCUMENTS 6,947,927 B2  9/2005  Chaudhuri et al.
7,047,242 B1  5/2006  Ponte
(Continued)

FOREIGN PATENT DOCUMENTS

CA   2622268   4/2007
CA   2701171   4/2008

OTHER PUBLICATIONS

Office Action issued in Canadian Application No. 2,772,638 dated Nov. 25, 2016.
(Continued)

*Primary Examiner* — Hung Le
(74) *Attorney, Agent, or Firm* — Fish & Richardson P.C.

(57) ABSTRACT

Methods, systems, and apparatus, including computer programs encoded on computer storage media are provided. An example method includes receiving user input in a control, for example, one associated with a search engine. The user input includes a series of input characters that when completed would form a completed user request. The method further includes, while receiving the user input, evaluating the characters to identify completions for the completed request. The method further includes identifying, by one or more processors, a content item associated with the one or more completions and identifying display data associated with the content item for transmission to the user along with one or more completions in response to receiving the user input.

17 Claims, 9 Drawing Sheets

Related U.S. Application Data continuation of application No. 12/939,948, filed on Nov. 4, 2010, now Pat. No. 8,676,828.

(60) Provisional application No. 61/258,144, filed on Nov. 4, 2009.

(51) Int. Cl.
  *G06F 17/27* (2006.01)
  *G06F 3/0482* (2013.01)

(56) References Cited

U.S. PATENT DOCUMENTS

| | | | |
|---|---|---|---|
| 7,523,099 B1 | 4/2009 | Egnor | |
| 7,844,599 B2* | 11/2010 | Kasperski | G06F 17/30967 707/713 |
| 7,921,107 B2* | 4/2011 | Chang | G06Q 30/02 707/706 |
| 7,984,004 B2 | 7/2011 | Andrew | |
| 8,027,879 B2 | 9/2011 | Ramer | |
| 2003/0033288 A1* | 2/2003 | Shanahan | G06F 17/3064 |
| 2003/0163782 A1* | 8/2003 | Owen | G06F 17/243 715/225 |
| 2004/0186827 A1* | 9/2004 | Anick | G06F 17/30646 |
| 2005/0076019 A1 | 4/2005 | Jackson et al. | |
| 2005/0283468 A1 | 12/2005 | Kamvar et al. | |
| 2006/0217953 A1 | 9/2006 | Parikh | |
| 2006/0230005 A1 | 10/2006 | Bailey et al. | |
| 2006/0248078 A1 | 11/2006 | Gross et al. | |
| 2007/0050339 A1 | 3/2007 | Kasperski et al. | |
| 2007/0061317 A1 | 3/2007 | Ramer et al. | |
| 2007/0162422 A1* | 7/2007 | Djabarov | G06F 17/30646 |
| 2007/0162481 A1 | 7/2007 | Millett | |
| 2008/0016034 A1 | 1/2008 | Guha et al. | |
| 2008/0104032 A1* | 5/2008 | Sarkar | G06F 17/3089 |
| 2008/0109401 A1* | 5/2008 | Sareen | G06F 17/30864 |
| 2008/0114743 A1 | 5/2008 | Venkataraman et al. | |
| 2008/0140519 A1 | 6/2008 | Thiesson et al. | |
| 2008/0147653 A1* | 6/2008 | Collier | G06F 17/30864 |
| 2008/0177717 A1 | 7/2008 | Kumar et al. | |
| 2008/0214156 A1 | 9/2008 | Ramer et al. | |
| 2009/0024465 A1 | 1/2009 | Burckart et al. | |
| 2009/0030869 A1* | 1/2009 | Aharoni | G06Q 10/00 |
| 2009/0043741 A1 | 2/2009 | Kim | |
| 2009/0094145 A1 | 4/2009 | Kim et al. | |
| 2009/0094211 A1 | 4/2009 | Marvit et al. | |
| 2009/0106224 A1 | 4/2009 | Roulland et al. | |
| 2009/0119289 A1 | 5/2009 | Gibbs et al. | |
| 2009/0171929 A1* | 7/2009 | Jing | G06F 17/3064 |
| 2009/0187515 A1 | 7/2009 | Andrew et al. | |
| 2009/0240683 A1* | 9/2009 | Lazier | G06F 17/30864 |
| 2009/0287680 A1 | 11/2009 | Paek et al. | |
| 2009/0313237 A1 | 12/2009 | Agrwal et al. | |
| 2009/0327235 A1 | 12/2009 | Coladonato et al. | |
| 2010/0211588 A1* | 8/2010 | Jiang | G06F 17/30637 707/768 |
| 2010/0228710 A1 | 9/2010 | Imig et al. | |
| 2010/0275109 A1* | 10/2010 | Morrill | G06F 17/2235 715/205 |
| 2010/0287170 A1* | 11/2010 | Liu | G06F 17/30696 707/759 |
| 2010/0306228 A1 | 12/2010 | Carpenter et al. | |
| 2011/0022635 A1* | 1/2011 | Michael | G06F 17/30398 707/780 |
| 2011/0060984 A1 | 3/2011 | Lee | |
| 2011/0258035 A1 | 10/2011 | Oren et al. | |
| 2011/0264537 A1 | 10/2011 | Kwon | |
| 2013/0053005 A1 | 2/2013 | Ramer et al. | |
| 2013/0055097 A1 | 2/2013 | Soroca et al. | |
| 2013/0097015 A1 | 4/2013 | Ramer et al. | |
| 2013/0122874 A1 | 5/2013 | Ramer et al. | |
| 2014/0136543 A1 | 5/2014 | Frieden et al. | |
| 2014/0172562 A1 | 6/2014 | Weatherford | |

OTHER PUBLICATIONS

Bast, Holger; "Type Less, Find More: Fast Autocompletion Search With a Succinct Index;" Proceedings of the 29th Annual International ACM Sigir Conference on Research and Development in Information Retrieval; Seattle Washington, Aug. 6-11, 2006, pp. 364-371.

Li, Guoliang; "Efficient Type-Ahead Search on Relational Data: a TASTIER Approach;" Proceedings of the 35th Sigmod International Conference on Management of Data; Providence, Rhode Island, Jun. 29-Jul. 2, 2009, pp. 695-706.

White, Ryen W.; "Studying the Use of Popular Destinations to Enhance Web Search Interaction;" Proceedings of 30th Annual International ACM Sigir Conference on Research and Development in Information Retrieval; Amsterdam, The Netherlands, Jul. 23-27, 2007, pp. 159-166.

Invitation to Pay Additional Fees and, Where Applicable, Protest Fee and Partial International Search for International Application No. PCT/US2010/047409; dated Jan. 19, 2011, 9 pages.

International Search Report and Written Opinion for Application No. PCTUS2010047409; dated Jul. 7, 2011, 23 pages.

Authorized Officer Lingfei Bai, International Preliminary Report on Patentability; PCT/US2010/047409; dated Mar. 15, 2012, 15 pages.

"Google Suggests Search Destinations" TechWeb. Dec. 10, 2004 [recovered from ProQuest on Mar. 15, 2013], 1 page.

Chinese Office Action in Chinese Application No. 201080046824.2, dated Jan. 26, 2014, 16 pages (with English translation).

Office Action in Australian Application No. 2010286374, dated Aug. 27, 2014, 3 pages.

Chinese Office Action in Chinese Application No. 201080046824.2, dated Sep. 26, 2014, 5 pages (with English translation).

Chinese Office Action in Chinese Application No. 201080046824.2, dated Jun. 5, 2015, 10 pages (with English translation).

Office Action issued in Korean Application No. 10-2016-7032629, dated Jan. 19, 2017, 8 pages (with English Translation).

Office Action issue din Korean Application No. 10-2016-7032629, dated Jul. 24, 2017, 3 pages (with English translation).

* cited by examiner

SELECTING AND PRESENTING CONTENT RELEVANT TO USER INPUT

CROSS-REFERENCE TO RELATED APPLICATION

This application is a continuation and claims priority to U.S. application Ser. No. 14/215,202, now U.S. Pat. No. 9,361,381, filed on Mar. 17, 2014, titled "Selecting and Presenting Content Relevant to User Input," which is a continuation and claims priority to U.S. application Ser. No. 12/939,948, now U.S. Pat. No. 8,676,828, filed on Nov. 4, 2010, titled "Selecting and Presenting Content Relevant to User Input," which claims priority to U.S. Provisional Application No. 61/258,144, filed on Nov. 4, 2009, titled "Selecting and Presenting Content Relevant to User Input." The disclosure of each of the foregoing applications is incorporated herein by reference.

BACKGROUND

This specification relates to providing information relevant to user requests.

Internet search engines identify resources, e.g., Web pages, images, text documents, and multimedia content, in response to queries submitted by users and present information about the resources in a manner that is useful to the users.

Conventional search services can include an input control that allows the user to provide a textual input in the form of a search query. In some conventional services, as the user provides the textual input, one or more suggestions for completing the textual input may be offered. For example, a drop down menu associated with the input control can be displayed that includes one or more popular suggestions to complete the textual input. Popularity is one metric that can be used to determine which suggestions to offer. A user can select one of the suggestions resulting in the submission of the completed textual input to the search service. In this case, the selection of the suggestion results in the submission of the completed textual input to the search service for processing. Results can then be returned to the user based on the completed textual input.

SUMMARY

This specification describes methods, systems, and apparatus including computer program products for presenting content in response to a user request.

In general, one aspect of the subject matter described in this specification can be embodied in computer-implemented methods that include the action of receiving user input in a control associated with a search engine. The user input includes a series of input characters that when completed would form a completed search query. The methods further include the action of, while receiving the user input, evaluating the characters to identify completions for the completed search query. The methods further include the action of identifying, by one or more processors, a content item associated with the one or more completions. The methods further include the action of identifying display data associated with the content item for transmission to the user along with one or more completions in response to receiving the user input.

These and other embodiments can each optionally include one or more of the following features. The series of input characters forms a portion of a first or second search term of the completed search query. The series of characters is a prefix. The prefix includes a first search term and a portion of a second search term. The selection of a completion for presentation to the user is based on frequency of previously performed searches. The content item is an ad. The content item is a link. The content item is an answer to a question described by the completed search query. The method includes presenting the content item in an augmented form of the control along with one or more completions. The method further includes presenting the content item in an augmented form of the control. The characters can be numbers, letters, symbols, or other identifiers.

In general, another aspect of the subject matter described in this specification can be embodied in computer-implemented methods that include the action of receiving user input in a control associated with a search engine. The user input includes a prefix that when completed would form one or more words in a completed search query. The methods further include the action of, while receiving the user input, evaluating the prefix to identify completions for the completed search query. The methods further include the action of identifying, by one or more processors, a likelihood that a particular one of the completions will constitute the completed search query. The methods further include the action of identifying a content item associated with a most likely of the one or more completions. The methods further include the action of identifying display data associated with the content item for transmission to the user along with one or more of the completions in response to receiving the user input.

These and other embodiments can each optionally include one or more of the following features. Receiving user input in a control includes receiving keystroke input. The control is a search input dialog.

In general, another aspect of the subject matter described in this specification can be embodied in computer-implemented methods that include the action of receiving user input in a control associated with a webpage. The user input includes a prefix that, when completed, would form a completed user request. The methods further include the action of, while receiving the user input, evaluating the prefix to make suggestions for completing at least a portion of the request. The methods further include the action of, having identified the suggestions, identifying, by one or more processors, a content item associated with at least one of the suggestions. The methods further include the action of identifying display data associated with the content item for presentation to the user along with one or more suggestions in response to the request.

These and other embodiments can each optionally include one or more of the following features. The method includes identifying a suggestion most likely to constitute the request and selecting the content item includes selecting a content item associated with the suggestion.

In general, another aspect of the subject matter described in this specification can be embodied in computer-implemented methods that include the action of receiving user input in a control associated with a webpage. The user input includes a prefix that when completed would form a completed user request. The methods further include the action of, while receiving the user input, evaluating the prefix including determining one or more completions that embody the request. The methods further include the action of identifying by one or more processors, a content item associated with the prefix and one or more of the completions. The methods further include the action of identifying display data associated with the prefix and the content item for presentation to the user in an augmented form of the control.

In general, another aspect of the subject matter described in this specification can be embodied in computer-implemented methods that include the action of, while receiving a first text input entered in a search engine query input field by a first user, and before the user has submitted the first text input as a search request, deriving, in a data processing system, a first dominant query from the first text input. The action further includes obtaining, by the system, a content item associated with the first dominant query that has a quality score that is greater than a threshold. The action further includes presenting the content item and dominant query in an augmented search engine query input field to the first user.

These and other embodiments can each optionally include one or more of the following features. The quality score is associated with the content item, the first dominant query or both.

Particular embodiments of the subject matter described in this specification can be implemented so as to realize one or more of the following advantages. Relevant suggestions can be identified before a user completes his or her search query. Additional content can be presented along with the suggestions to the user. The selection of one or more content items presented with the suggestions can result in a redirection to a defined resource and obviate or otherwise avoid completion of the search based on the input provided by the user.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
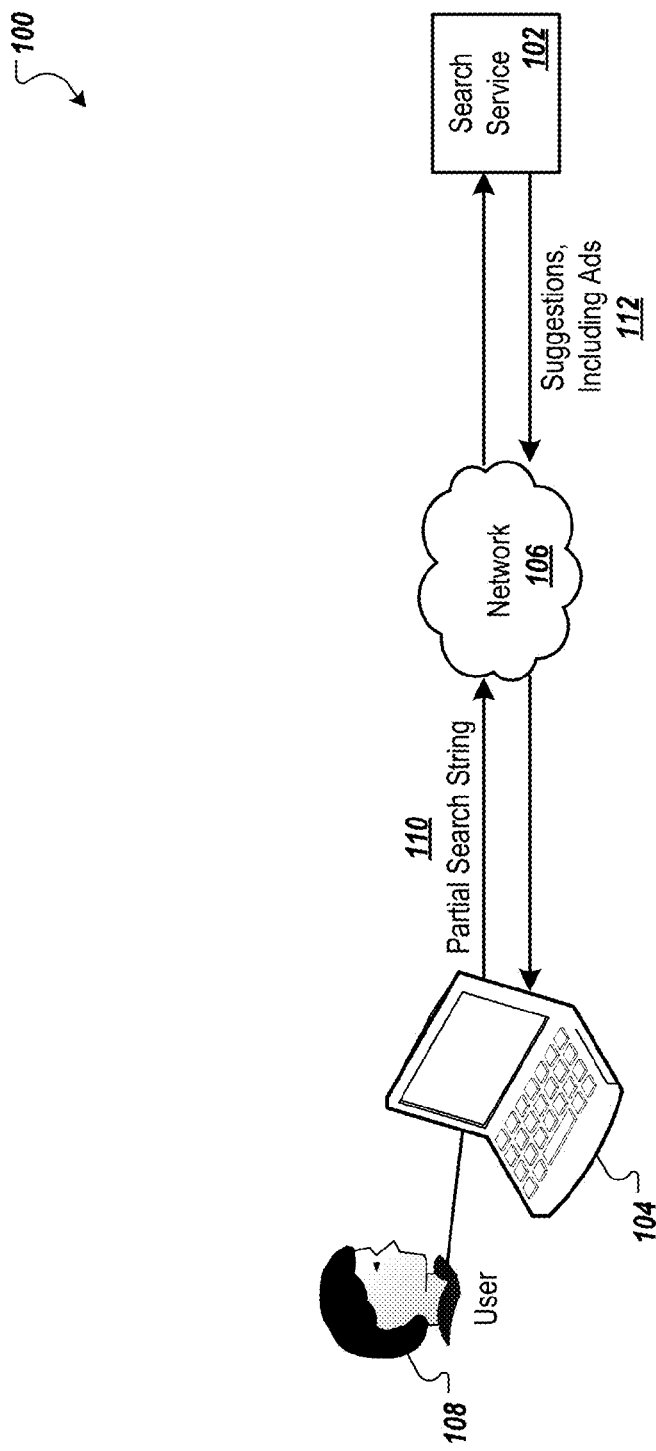
FIG. 1 illustrates a system for determining and providing suggestions including additional content related to the suggestions in response to a user request.

FIG. 1 illustrates an example system 100 for determining and providing suggestions and associated content in response to user input. The associated content can be of the form of Web content and/or Web-based advertisements (or "ads") that are associated with the suggestions. Non-ad Web content can include links to web sites or other content, news, weather, images, video, auctions, related information, answers to questions, or other information. The identification of the associated content is described in greater detail below.

System 100 receives user input, typically in a control (e.g., a search query box) that is presented on a user interface associated with the client device 104. The control can be of the form of a textual input box or other input mechanism that is configured to receive user input. In some implementations, the user input is of the form of textual characters, tokens or other input that make up a request. The user input can include numbers, letters, symbols, or other identifiers. The request can be of the form of a search query. In some implementations the user input is evaluated as the input is received, that is, as each textual character or token is provided. The client device 104 can provide the user input, by way of the network 106, to the search service 102 as it is entered. In return, the search service can provide suggestions along with other content back to the client device 104. While the system shown includes a remote search service that is linked by way of the network, portions of the search service 102 can be included in the client device 104. While the system is described with reference to a search service 102, other forms of user requests and other services can be provided in support of a given user input.

The system 100 can provide suggestions, for instance, as completions in the form of multi-term phrases or dominant queries that are derived from the received user input. For example, the search service 102 can evaluate the user input as received and identify one or more completions based on the user input. Based on the completions, one or more associated content items can be identified. Ones of the completions (e.g., popular ones) can be provided as suggestions to the user. The additional content items can be merged with selected ones of the completions and provided for display to the user. The suggestions can be displayed in proximity to or in an augmented form of the control that receives the user input. For example, the suggestions and associated content can be included in an answer box that is displayed in proximity to the control (e.g., a search query box). In some implementations ads, navigational links, static content, video content, or other content can be displayed in an answer box adjacent to (e.g., directly below) an input control (e.g., a search query box) on the user's computer screen. The suggestions and additional content items can appear on the user's screen in an answer box or other form of display element after the user has entered just a portion (e.g., a few characters) of the query, such as after the input is sufficient to generate useful suggestions. In some implementations, one or more content items are provided along with one or more suggestions for completing the user input. The content items can be included along with the suggestions or presented in a separate augmented form of the control (e.g., expanded textual input box or drop down box).

As shown in FIG. 1, the system 100 includes a search service 102 that is communicatively coupled to client device 104 via a network 106. The search service 102 can be any content provider or search engine provider that provides content and/or ads in response to user queries, inputs or other selections. Other forms of service are possible. The search service 102 can be accessible from applications running on the client device 104, such as coupled to (or in communication with) the user's Web browser, any search input dialog, and so forth. The information returned by the search service 102 can include suggestions, content related to the suggestions, search results (e.g., Web content, etc.) as well as content (e.g., advertisements) that may correspond to the search results. In some implementations, the system 100 can be used to provide suggestions based on partial input that the user has provided in applications other than Web browsers, such as input boxes or other controls used in support of other applications (e.g., forms used in online shopping applications).

For the purposes of this disclosure, the user input received and processed to determine suggestions and related content is referred to herein as a prefix. The prefix can constitute one or more textual characters that are entered by/received from the user. A completion refers to a particular completed request, and can be based on historical processing of other requests. For example, a completion can be of the form of words or phrases that embody the request the user is providing, as evaluated as a portion of that request is entered. In some implementations, the suggestions and/or additional content (e.g., advertisements) returned by the search service 102 can correspond to content exactly matching the prefix entered by the user. For example, if the user enters "bicyc", the system 100 can generate suggestions and locate additional content items related to the subject of bicycles, such as suggestions for ads for local bicycle shops. In some implementations, the information returned by the search service 102 can be based on the user's interests, profile information, geographical location, etc. These additional criteria can be combined for use with the user's input in order to provide targeted content.

The suggestions can be displayed on the client device 104, which can be a laptop computer, a desktop computer, a portable computing device, a smartphone, a mobile telephone, a personal digital assistant (PDA), or any other device capable of requesting and/or receiving content. Such content can be received on the client device 104 using the network 106, such as the Internet (e.g., using wireless or wired access), local area network (LAN), wide area network (WAN), a satellite network, or any other network, etc.

In one example scenario of the system 100, a user 108 can enter a partial search string 110. For instance, the partial search string 110 can form a part of a longer or complete string. As an example, the user 108 can be in the initial stages of entering the request "google." Thus, after entering four characters of "google," the partial search string 110 can be "goog." As a result, suggestions 112 returned by the search service 102 can correspond to the partial search string 110 comprising "goog," and the suggestions 112 can be search words or phrases all starting with or including "goog." In some implementations, the suggestions 112 can include search words or phrases for suggestions that contain, but not necessarily start with, "goog" such as "www.google.com."

Figure 2:
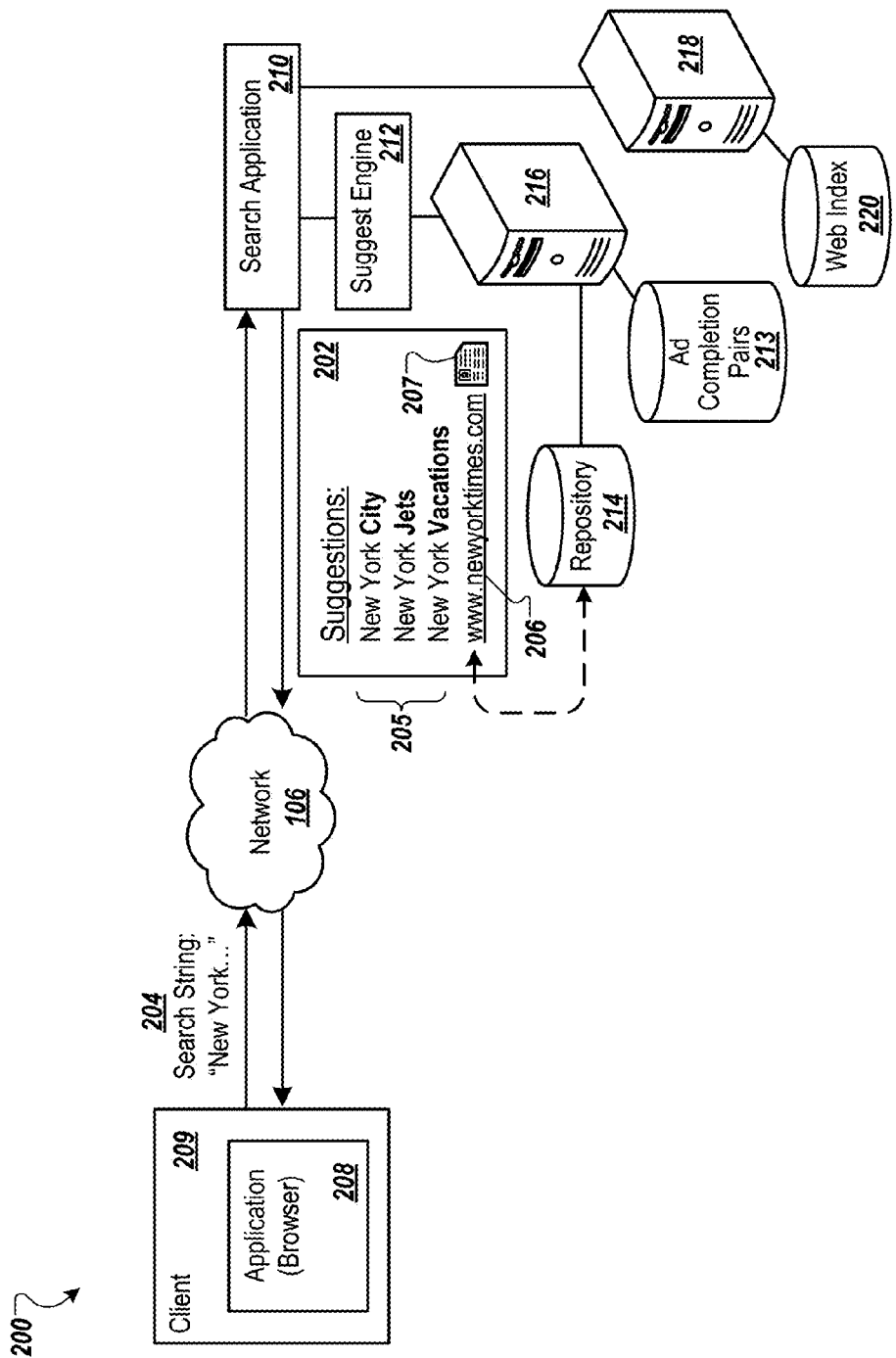
FIG. 2 illustrates an example system for providing one or more suggestions to a user based on user input.

FIG. 2 illustrates an example system 200 for providing one or more suggestions and additional content in a control 202 to a user based on user input. As one example, if the user enters a search string 204 such as "New York" in a browser query field, one or more suggestions 205 related to New York can be returned. Moreover, one or more additional content items 206 (e.g., ads) associated with the suggestions 205 are also returned, and can include ads associated with New York. The combined suggestions 205 and content items 206 can appear, for example, in an answer box, as suggested by the box (e.g., control 202) surrounding the suggestions.

For example, as shown in FIG. 2, the suggestions 205 are related to the user's prefix (i.e., partial input) of "New York" are "New York City . . . New York Jets . . . New York Vacations." The additional content items 206 include a single ad, an advertisement for the New York Times, which consists of a display of the news publisher's home page Uniform Resource Locator (URL) www.newyorktimes.com and a newspaper icon 207.

In the example involving "New York," both terms "New" and "York" have been provided in their entirety by the user. However, suggestions can be generated for partial entries of a word. For example, the completions "apple computer" or "applied physics" can be associated with the prefix "appl." In general, portions of the search string 204 can be combined, expanded, or corrected in any way in generating completions. For example, completions can be based on any series of input characters that forms the prefix. In some implementations, the prefix can include a portion of a search term, or the prefix can include a first search term and a portion of a second search term, to name a few examples.

Suggestions 205 can be provided to a browser 208 executing on a client 209, such as the user's laptop computer, desktop computer, smart phone, cell phone, PDA, or other electronic device used for accessing the Internet. The browser 208 and the client 209 can receive the suggestions 205 and additional content items 206 over the network 106 (e.g., the Internet or other network) from a search application 210 coupled to a search engine 212. As one example, the search application 210 can be any search application, and the search engine 212 can be any or all of the multiple search engines used by any search service to process any number (e.g., millions or more) of searches each day.

In some implementations, cached ad-completion pairs 213 can provide the basis for generating additional content items 206. The system 200 can populate and update the ad-completion pairs 213 by querying ad mixers (not shown) in the background. For example, completions can be determined based on predictions of the most popular requests (e.g., search queries) received. One or more content items can be associated with each completion, forming pairs that are stored as ad-completion pairs 213. The actual additional content items or links thereto can be stored, for example, in repository 214. The repository 214 can include, for example, keywords or other information from the ads and associated ad creatives. Ad-completion pairs 213 can be indexed by completion, keywords associated with a completion, or other means. Which completions are associated with which ads (and hence mapped in the form of ad-completion pairs) can be based on the frequency of previously performed searches. This provides the advantage of caching matching items that are generally more likely to lead to specific additional content that is useful to the user.

In some implementations, the cached ad-completion pairs 213 can include all relevant information, including the ad creative for a particular ad, thereby obviating the need for repository 214. In this way, ads can be served directly from the cache.

In some implementations, additional content items 206 can include a content item or a link to a content item. In some implementations, the content item can be an answer to a question described by the completed search query, such as "where can I buy Macintoshes online?" In this case, the content item or suggestions returned may not contain any of the terms included in the user input received (e.g., "where can I buy Macintoshes online?") but may instead "answer the question," listing suggestions for ads and content related to the answer to the question.

The cached ad completion pairs 213 can be maintained and updated, for example, by periodically (e.g., every half hour) accessing ad information from ad mixers or other sources of content. Updates to the cached ad completion pairs 213 can occur by expanding prefixes into completions, and fetching or identifying content items for each completion identified by the ad mixers.

The search engine 212 can access the additional content items stored in or pointed to by the ad-completion pairs 213 (e.g., by accessing individual content items in repository 214). Access to the additional content items can be provided by an ad server 216, capable of retrieving additional content items in various ways, including ads associated with keywords or other criteria. Search engine 212 can also access a web content server 218 that uses an index 220 to locate web content corresponding to an input search query.

Figure 3:
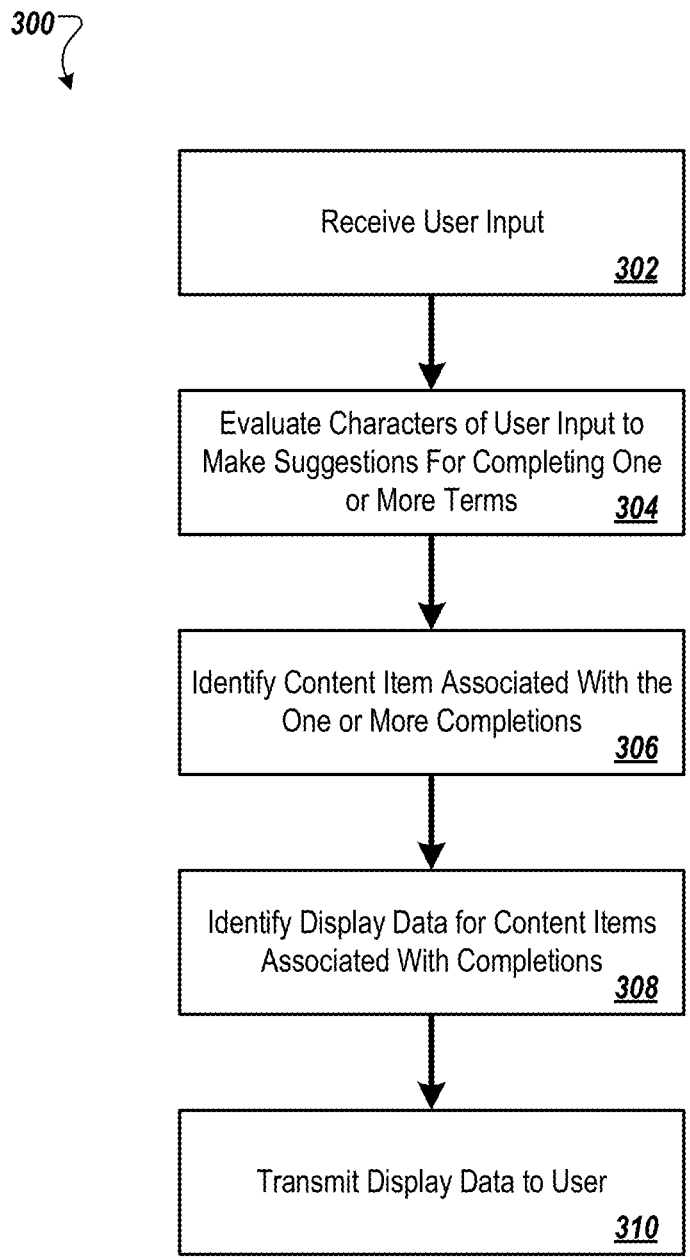
FIG. 3 illustrates an example method for obtaining and presenting content to a user based on suggestions derived from user input.

Referring now to FIG. 3, a method 300 is shown for providing content to a user. The method 300 can be performed by a system, such as that shown in FIG. 2. At stage 302, textual user input is received. For example, a user can enter a search string 204 (e.g., "New York") in a search control within the application 206 that displays a web page associated with the client 208 (e.g., the user's computer). Alternatively, a user can provide a voice command into a microphone that is received and transformed into a request that is provided to the search service. A search application 210 can receive the search string 204 for processing.

At stage 304, tokens (e.g., characters) of the user input are evaluated in order to make suggestions for completing one or more terms. For example, after receiving the search string 204 (e.g., "New York"), the search application 210 can invoke the suggest engine 212 to identify completions based upon the user input, such as "New York City . . . New York Jets . . . New York Vacations." In this example, the completions identified here can be the same or different than those made after the user has entered fewer characters, such as just "New Y", "New Yo" or "New Yor", and not completing the second term "York".

At stage 306, a content item associated with one or more completions is identified. For example, the suggest engine 212 can provide identified completions to ad server 216 to identify relevant related content to the identified completions. Ad server 216 can match the completions to ad-completion pairs 213 to identify particular content items associated with a given completion.

Display data associated with the content item is identified at stage 308. Particular content items can be retrieved from repository 214 and combined with completions provided by the suggest engine 212 to form the display data. The display data can include the suggestion itself, any identified additional content items and any renderable control, including a link, image, etc. that is associated with the suggestion or the additional content item. For example, for the additional content item 206 related to the www.newyorktimes.com, the display data can include the link or URL associated with the NY Times, as well as the newspaper icon representing a newspaper.

At stage 310, display data is transmitted to the user. For example, the search application 210 can transmit the display data to the user via the network 106. The display data can be received on the user's client 209 for display in an application 208 (e.g., a web browser). The display that the user sees in his browser, for example, can be an answer box directly below the search field, and the answer box can contain the display data, including the suggestions and the additional content items identified by the suggest engine 212.

Figure 4:
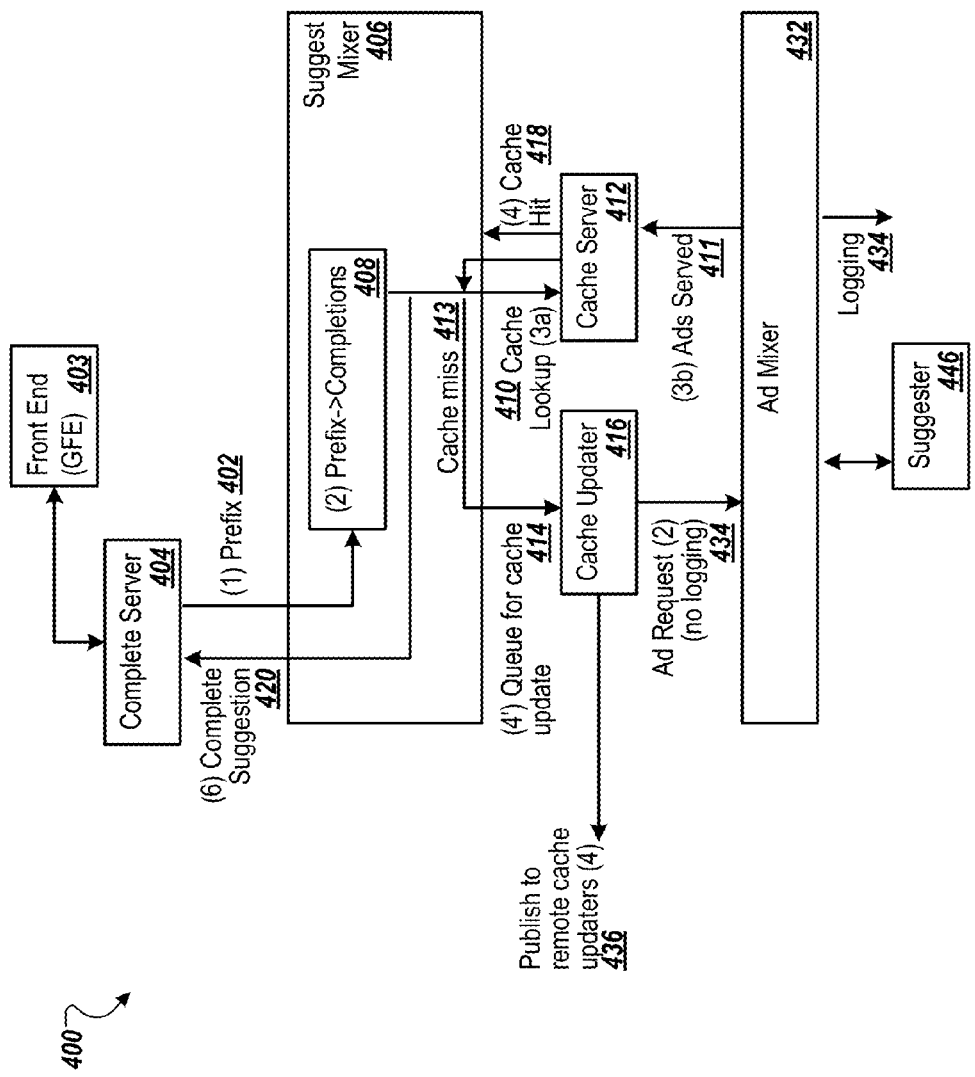
FIG. 4 illustrates an example architecture for a serving system and a flow for serving suggestions based on user input.

FIG. 4 illustrates an example architecture for a content serving system 400 and attending flow information for serving suggestions and additional content based on user input. For example, the user input, in the form of a prefix 402 or other portion of a user request, can originate from a front end 403, such as a front end within the user's web browser running on the user's client. The input can be passed from the front end to a complete server 404 and on to a suggest mixer 406. Passing the prefix 402 can be implemented as call from the complete server 404 to a prefix-completion module 408 within the suggest mixer 406. The suggest mixer 406 can auto-expand the prefix 402 into a set of potential completions. Expansion can be performed using suggestion-completion tables (e.g., either in memory or accessible via calls) or other data sources. For each of these completions, the suggest mixer 406 can generate a lookup 410 directed to a set of cache servers 412 for content items (e.g., ads 411) related to the completions. The cache key can be, for example, "(query x country x language x exact/broad x suggest_experiment_id)" or some other format. If there are no cache hits (e.g., a cache "miss" 413), the suggest mixer 406 can be notified of the miss, and a new key can be registered 414 (e.g., queued for a cache update) to a local cache updater 416. The cache update 416 can be used to populate/update the cache with new updated ad-completion pairs that can be matched against new requests from the user. Alternatively, if there are cache hits 418, the suggest mixer can return one or more content items (e.g., ads) along with the completions 420 (e.g., as complete tokens) to the complete server 404. As described above, the additional content items can be of the form of valid redirect URLs with valid clickstrings (e.g., the displayable label or link that the user sees).

The cache lookup 410 can be initiated when a request to suggest additional content items is received from the complete server 404. The prefix-completions module 408 can expand the received prefix into all possible completions in-memory. The most likely completions can be identified by the prefix completion module 408 and a search of the cache for additional content items associated with the most likely completions can made. The cache lookup 410 can access the cache server 412 to determine if any additional content items (e.g., ads) are associated with the one or more most likely completions. In some implementations, the cache key used can have the format (query x country x language x exact/ broad x suggest_experiment_id). In some implementations, to assure the use of up-to-date content items, any content item returned by the cache server 412 that is older than a pre-determined age (e.g., 30 minutes) can be discarded. If a cache key results in a cache miss 413, or if stale (older than 30 minutes, for example) content items are returned, the suggest mixer 406 can make a call to the cache updater 416. The call can result in the cache key being added to the in-memory set of keys for the purpose of queued updates to the cache. Content items that are not discarded, for instance, can be served.

In some implementations, user reaction to the additional content items can be tracked. For example, any user click on an ad can trigger click serving and click logging, capturing the information in a collection of historical logs. The suggest mixer 406 can also issue a log request to an ad mixer 432 to explicitly log the shown ads as an impression. Click logging and the resulting log can be used, for example, to track the costs charged to advertisers based on the number of times and other factors associated with serving respective ads.

The cache updater 416 can be a separate application running alongside the ad mixer 432 and the cache servers 412 in each data center, such as if multiple data centers are used to serve the additional content items (e.g., ads) and suggestions. Cache updaters 416 in general can be responsible for periodically refreshing the cache by directly querying various ad mixers, such as the ad mixer 432. The cache updater 416 can maintain a list of cache keys and associated stats in-memory. The cache key can be, for example, in a form such as "(query x country x language x exact/broad x suggest_experiment_id)". The cache updater 416 can continuously monitor ad requests corresponding to these cache keys, and issue ad request calls 434 against production mixers. The returned ads served can also be published 436 to other remote cache updaters in other datacenters, which can cache them in the corresponding cache servers 412 in that datacenter.

The ad mixer 432 can interact with other components of the system 400, such as a keyword server that provides access to a repository of all keywords associated with content items in the system, as well as tools for matching content items with keywords. A creative server can provide access to the creatives for all of the content items under control of the system 400. A Uniform Resource Locator (URL) server can maintain and provide access to all of the URLs for content items, including ad landing pages, alternate pages, redirects, etc. A suggester 446 can generally identify ads matching keywords or other criteria.

Controls

Suggestions and additional content items can be presented in a user interface executing on a client device (e.g., client device 104). The user interface can include a control, for example a search engine text box that receives the user input. In response to receipt of the user input, suggestions and additional content can be presented in a control (i.e., in the same control, an augmented form of the control, or a separate control). Reference is made herein to "control" as a user interface element that is used to present suggestions and additional content in response to received user input. The control is interactive, in that the control can be configured to receive user input (e.g., mouse selections of one or more items presented in the control) and in response thereto, provide one or more of the following. Upon detecting a selection of a suggestion, the control can complete the user input and submit the completed user input to the appropriate service (e.g., to the search service). Upon detecting a selection of an additional content item, the control can perform one or more operations including expanding a presentation associated with the additional content item, redirecting the browser to a link associated with the additional content item, navigating to a landing page associated with the additional content item, to name a few examples. Other operations are possible.

One form of the control is a drop down menu box that is presented in proximity to a text box that received the user input. Other forms of control are possible. One particular form of control is an answer box. An answer box is a user interface element that can provide an answer to a question, and assumes the user input is of the form of a question. Answer boxes can be formatted to provide answers in the form of suggestions to a user. Answer boxes can as well provide additional content along with the suggestions.

Answer Box Architecture

Figure 5:
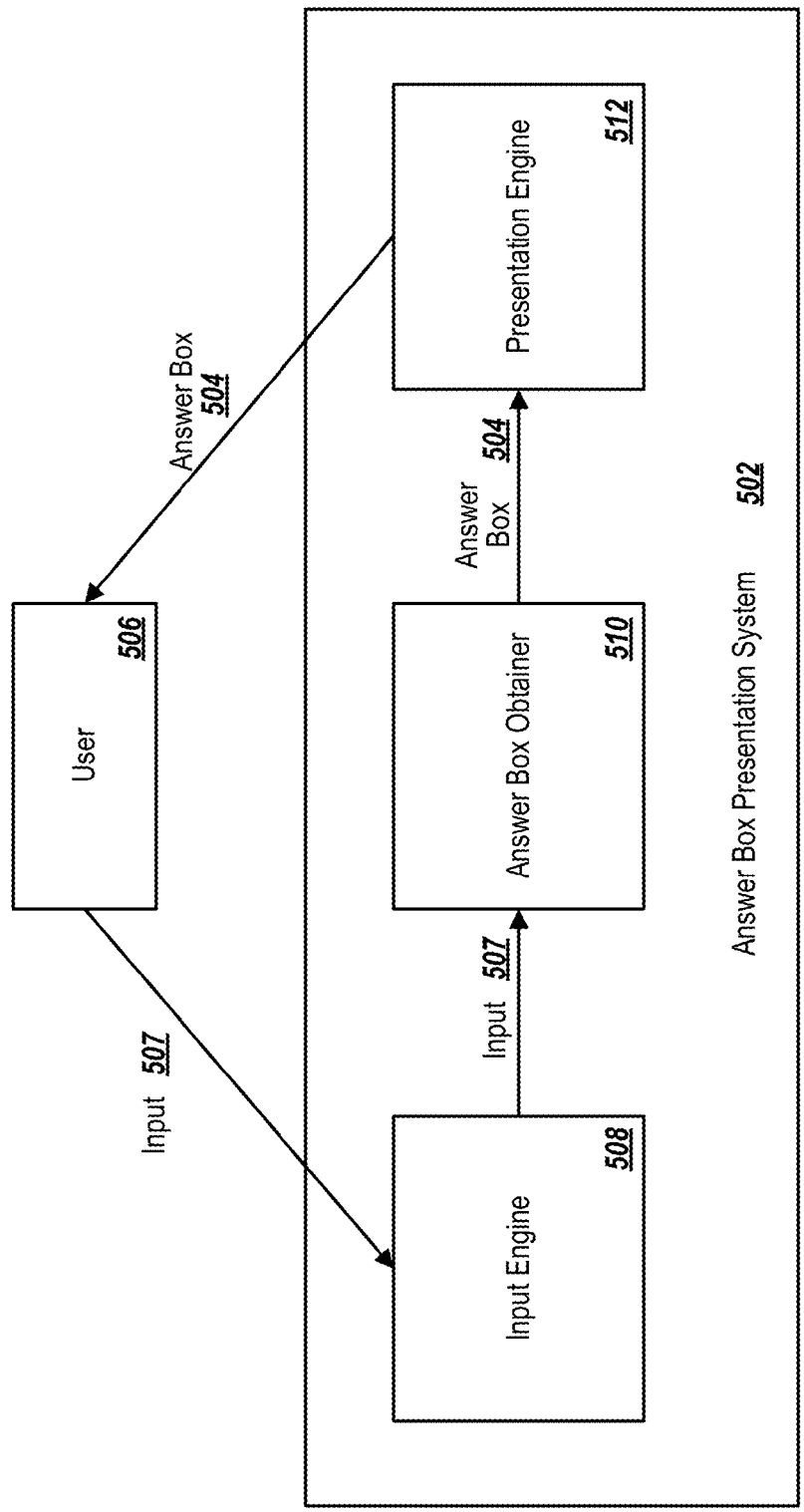
FIG. 5 illustrates an example answer box presentation system.

FIG. 5 illustrates an example answer box presentation system 502. In the example shown, the answer box presentation system 502 is part of a search engine system. The search engine system uses the answer box presentation system 502 to obtain an answer box 504, and then present the answer box 504 to a user 506. The answer box presentation system 502 does all of this while the user 506 enters text input 507, and before the user 506 submits a search request for the text input 507. The answer box presentation system 502 can select and present the answer box 504 even when the text input 507 does not match a specific, complete phrase associated with the answer box 504.

The user 506 interacts with the answer box presentation system 502, for example, through a search engine user interface presented on a user device. The search engine user interface can be a search web page or an application interface. Example user devices include computers and mobile devices. The search engine user interface includes a query input field where a user enters the text input 507, and a mechanism that the user can use to submit a search request. The query input field can be, for example, a field in a search engine web page, a field in a toolbar running in a web browser of the user, or a field in a search application running on the user device. The user 506 can use the mechanism to submit a search request for text input, for example, by pressing a search button in the search engine user interface, pressing the "enter" key in the query input field, or otherwise indicating that the user 506 has finished entering input and the search engine should identify search results responsive to the input in the query input field. The search engine user interface can further present information, for example, query suggestions, answer boxes, additional content related to the query suggestions and search results, to the user 506.

The answer box presentation system 502 includes an input processor 508, an answer box obtainer 510, and a presentation engine 512. These software components can run on the user device or on one or more servers, for example, search engine servers, connected to the user device through a network.

The input processor 508 receives text input 507. For example, the text input 507 can be text input entered in a search engine query input field by the user 506, or the text input 507 can be text generated from voice input received from the user. The input processor 508 receives the text input 507 and determines whether the input should be sent to the answer box obtainer 510. The input processor 508 can verify that the user 506 has not submitted a search request, e.g., that a user has not used the mechanism in the search user interface, or any other mechanism, to send input to the search engine indicating that the user has finished entering input and that the search engine should identify search results responsive to the input in the query input field. The input processor 508 can also consider other factors, for example, whether the text input has a minimum number of characters, is ambiguous, or whether a predetermined amount of time has passed since the user 506 entered the last character of the text input 507.

Once the input processor 508 verifies that the text input 507 should be sent to the answer box obtainer 510, the input processor 508 sends the text input 507 to the answer box obtainer 510. The answer box obtainer 510 obtains an answer box 504 for the text input 507. The answer box obtainer 510 is described in more detail below with reference to FIG. 6.

The presentation engine 512 receives the answer box 504 from the answer box obtainer 510 and presents it to the user 506, e.g., by sending data representing the answer box 504 to the user device for presentation in the search engine user interface. The presentation engine can send other data in addition to the selected answer box 504. For example, the presentation engine can receive a set of query suggestions, generate output comprising a list of query suggestions, additional content items related to the identified query suggestions and the selected answer box 504, and send data representing this output to the user device for presentation to the user 506. The presentation engine 512 can receive the query suggestions from a query suggestion engine that generates query suggestions for the text input 507, for example, using conventional techniques. Additional content items can be provided by the systems 200 and 400, which are described with respect to FIGS. 2 and 4, respectively. The user device can present the suggestions and the answer box 504, for example, in a drop down menu that appears below the search engine query input field in the search engine user interface. The suggestions and the answer box 504 can be presented even if a user has not entered input indicating that the user wants the suggestions or answer box 504 to be presented. The user device can alternatively use other configurations for presenting the output to the user 506. Example presentations are described below, with reference to FIGS. 7A-7D.

Figure 6:
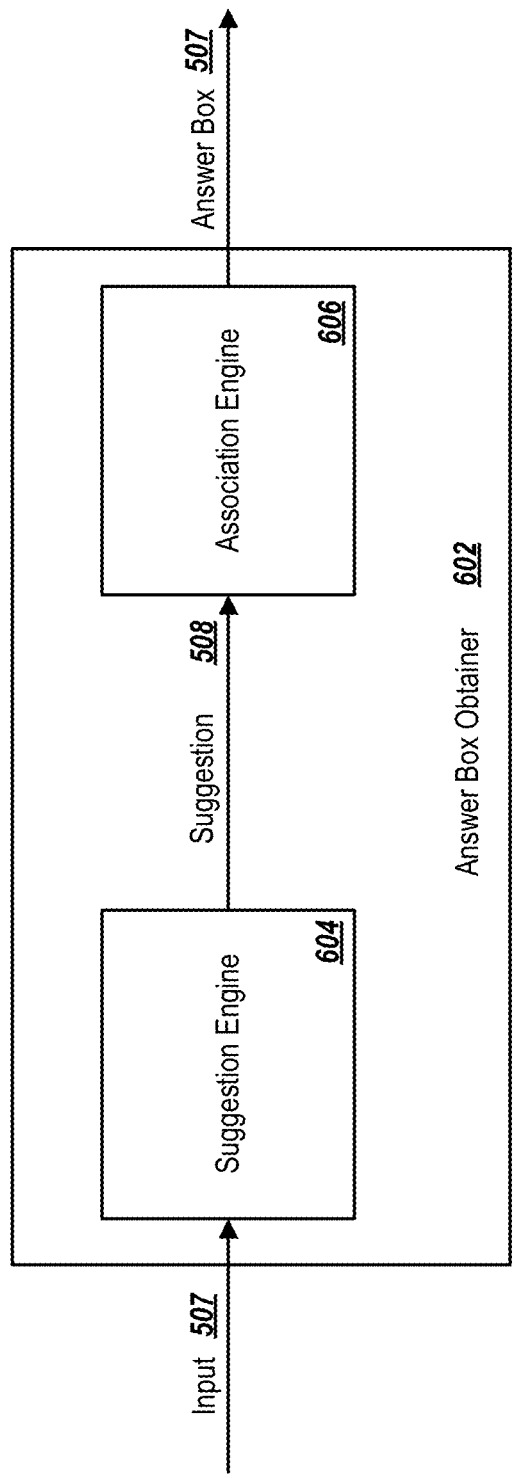
FIG. 6 illustrates an example answer box obtainer.

FIG. 6 illustrates an example answer box obtainer 602. The example answer box obtainer 602 is an example of the answer box obtainer 510 described above with reference to FIG. 5.

The answer box obtainer 602 includes a suggestion engine 604 and an association engine 606. The answer box obtainer 602 derives a suggestion corresponding to the text input 507 using the suggestion engine 604, and obtains an answer box 504 associated with the suggestion using the association engine 606. While the below examples describe deriving a single suggestion, multiple suggestions for the input can be derived, and multiple answer boxes 504, each associated with one or more of the suggestions 608, can be obtained.

The suggestion 608 is a completion to the request that has been entered by the user. The suggestion can itself be of the form of a completed query that corresponds to the text input 507. The suggestion 608 can be the text input 507 itself, or can be different from the text input 507. The suggestion 608 can be a completion of the text input 507. For example, if the text input 507 is "weather San Fr," the suggestion 608 can be "weather San Francisco." The suggestion 608 can also be a modification of the text input 507. For example, if the text input 507 is "wetaher San Francisco," the suggestion 608 can be "weather San Francisco," thus correcting the misspelling of "weather." The suggestion 608 can also be both a modification and a completion of the text input 507. For example, if the text input 507 is "wetaher San Fr," the suggestion can be "weather San Francisco." The suggestion 608 can also be a query that is related to the text input 507. For example, the suggestion 608 can be a suggestion for the text input 507. As another example, when the input matches a keyword or regular expression associated with a particular category of answer box, but does not contain enough information to trigger a specific answer box, the suggestion 608 can be the part of the input that matches the keyword or regular expression, plus a completion of the rest of the text input 507. For example, if the text input 507 is "weather San," and the keyword "weather" is associated with a weather answer box, the system can generate the suggestion 608 by combining the keyword "weather" with a completion of the rest of the input "San." The completion can be generated using the techniques for generating the suggestion that are described below.

The suggestion engine 604 can derive the suggestion 608 from the text input 507 according to various heuristics. In some implementations, the suggestion is selected from a group of completions for the text input 507. The suggestion engine 604 can optionally add the text input 507 to the group of completions. The suggestion engine 604 receives the group of suggestions and determines a popularity value for each completion. The suggestion engine 604 receives the completions from a suggestion engine that generates query suggestions, for example, using conventional techniques.

The popularity value for a given completion is derived from the number of times one or more users submit a search for the completion. For example, the popularity value can be the number of times one or more users submit a search for the completion divided by the total number of times the one or more users submit queries for each of the completions, e.g.:

$$\text{popularity value}(\text{query } x) = \frac{\text{number of times users submit query } x}{\sum_i \text{number of times users submit query } i},$$

where query x is the completion for which the popularity value is being calculated, and each query i is a query in the group of query completions. The one or more users can be, for example, just the user who entered the text input 507, or a larger group of users.

Other formulas for determining the popularity value can also be used. For example, the suggestion engine 604 can optionally weight the number of times users submit each query by a measure of the quality of each query. The measure of quality can be derived, for example, from the number of times users select search results after issuing their queries, how long users view search results responsive to their queries, how often users refine their queries, and whether users interacted with other features of search result pages presented in response to their queries. As another example, the denominator in the popularity value can be a number of times queries that start with the input are submitted by users.

The suggestion engine 604 identifies the number of times users submit each query by analyzing user search history data. User search history data describes, for each user represented in the data, queries submitted by the user. The suggestion engine 604 analyzes the user search history data for the users and identifies the number of times the users submitted a query corresponding to each completion. The user search history data can be anonymized for privacy protection. For example, the user search history can refer to users by only an Internet protocol (IP) address of a user device or can generate a unique random number that is associated with the IP address of the user device. Other anonymization processes, such as hashing, encryption and obfuscation techniques, can also be used to ensure that user privacy is protected. The user search history data can also be sanitized to remove suspect traffic. Suspect traffic can be, for example, traffic that has been identified as being generated by bots, traffic that has been identified as being spam, or repeat queries that are submitted by the same user in close succession to each other.

Once the suggestion engine 604 determines the popularity value for each completion, the suggestion engine 604 selects one or more completions having criteria (e.g., popularity value, etc.) that exceed a threshold as the suggestion. Example thresholds include 60%, 66%, and 75%. The threshold can be determined empirically. For example, a threshold determination system (not shown) can determine the appropriate threshold by testing a variety of thresholds and determining whether or not they result in a desired behavior of the system. The threshold determination system can determine whether the behavior of the system is the desired behavior, for example, by using human evaluators that explicitly indicate whether they found a presented answer box to be useful, or would have found an answer box to be useful. As another example, the system can measure the number of times users indirectly indicate that they found a presented answer box to be useful. Users can indirectly indicate that they found a presented answer box to be useful, for example, by selecting an answer box that is presented for the text input 507, spending a long time viewing an answer box, clicking on a link in an answer box, or not submitting any additional searches after being presented with the answer box.

A threshold determination system can make various modifications to the above approach. For example, the threshold determination system can determine thresholds for just ambiguous inputs and then apply the thresholds to less ambiguous inputs. Ambiguous inputs are inputs that can trigger several different suggestions, for example, "weather San" which might trigger "weather San Jose," "weather San Francisco," "weather Santa Fe," etc. As another example, the threshold determination system can determine different thresholds for particular categories of answer boxes. The threshold determination system can select decreasingly lenient threshold scores for each category of answer boxes, until an acceptable threshold is found for each category. This allows the threshold determination system to make the thresholds as lenient as possible for each query.

In some implementations, the thresholds are user-specific. For example, if a user frequently triggers answer boxes of a particular category, or has profile data that indicates the user is interested in answer boxes of the particular category, the threshold can be more lenient for answer boxes of the particular category and the user. The thresholds can also be specific to categories of users, for example, users in the same location or users whose search histories indicate that they share search interests. Users' search histories can indicate that the users share search interests, for example, when the search histories have more than a threshold number of queries in common.

In some implementations, the suggestion 608 is a query that appears the most often among queries issued by the user that begin with text that matches the text input 507. In some implementations, the suggestion engine 604 analyzes user search history data for the user entering the text input 507 to find one or more queries previously submitted by the user that begin with text that matches the text input 507. Text matches the text input 507 if the text is identical to the text input 507, or differs from the text input 507 in inconsequential ways, e.g., as determined by the search engine system. Text differs from the text input 507 in inconsequential ways, for example, when the text and the text input 507 are identical, except for the use of stop words, spelling, word order, or the substitution of synonyms. For example, if the text input 507 is "weather San," or "wehather San" and the user had previously searched for "weather San Francisco," "weather San Jose," "the weather Santa Fe," and "weather Mountain View," the document query engine 604 identifies "weather San Francisco," "weather San Jose," and "the weather Santa Fe" as the most likely suggestions. The suggestion engine 604 ignores "weather Mountain View" as it does not start with input similar to "weather San." The suggestion engine 604 then selects the query having a number of appearances that satisfy a threshold.

The threshold can be a predetermined number of appearances. Alternatively, the threshold can be determined from the total number of times the queries were submitted. For example, the threshold can be fifty-percent of the submitted queries. For example, if the user searched for "weather San Francisco" ten times, "weather San Jose" five times, and "the weather Santa Fe" one time, and the threshold is fifty-percent of the number of times the user searched for the queries, the threshold is eight. The suggestion engine 604 selects "weather San Francisco" as the suggestion, because it was submitted ten times, and ten is greater than the threshold of eight. The suggestion engine 604 can optionally weight the number of times each query appears by the amount of time since each query was submitted, with a lower weight given to older queries.

In some implementations, the suggestion 608 is a query that is frequently submitted by the user, regardless of the text input 507. For example, the user can click on the query input field when the query field contains an empty text string as the text input 507. The suggestion engine 604 can then analyze the user search history to identify the queries that the user submits the most frequently, and select one of them as the suggestion. For example, the suggestion engine 604 can select a query that appears at least a threshold number of times in the search history. The threshold can be determined empirically.

In some implementations, the suggestion 608 is the query that will trigger an answer box of a category that is frequently triggered by queries issued by the user. The suggestion engine 604 can determine that a given category of answer box is frequently triggered by the user, for example, when the percentage of queries submitted by the user that trigger answer boxes of the given category is larger by a threshold amount from the percentage of queries submitted by a larger group of users that trigger answer boxes of the given category. Alternatively, the suggestion engine 604 can look at a smaller group of queries, for example, queries sharing a pattern matched by the input. For example, when the input includes a city name, the suggestion engine 604 can compute the percentage of queries including a city name. In some implementations, the suggestion engine 604 analyzes user search history data for the user entering the text input 507 to determine categories of answer boxes that would be triggered by previous queries submitted by the user. For example, if the user frequently searches for "weather" and various city names, the suggestion engine 604 identifies that the user frequently submits search queries that cause weather answer boxes to be presented. Therefore, if the text input 507 is the city name "San Jose", the query engine 604 can identify the suggestion as "San Jose weather." As another example, if the user frequently submits queries that trigger financial answer boxes that provide financial information on various stocks, and the user enters text input 507 identifying a stock, the suggestion engine 604 can identify the suggestion as "financial information" plus the name of the stock, or some other query that will similarly trigger a financial information answer box.

In some implementations, the suggestion 608 is the query that best fits with user profile data. User profile data can be explicit data entered by a user and can include, for example, a user's location, language, time zone, and preferences. User profile data can also be implicit data that is determined as needed, for example, the location of the user that is determined by applying geo-location to the user's IP address. In some implementations, the suggestion engine 604 processes the input to determine whether the input is missing terms or characters that would trigger a particular category of answer box. If the input is missing terms or characters that would trigger a particular category of answer box, the suggestion engine 604 can use the profile data to generate a suggestion that includes the missing terms or characters.

In some implementations, a combination of one or more of the heuristics and techniques described above can be used. For example, the suggestion engine 604 can selected the suggestion 608 from an analysis of query suggestions and user search history data for the user entering the text input 507. The suggestion engine 604 can filter out suggestions that do not appear more than a threshold number of times in the user search history data, or can adjust the popularity scores for the query suggestions described above by how frequently the query suggestions appear in the user search history data.

The association engine 606 receives the suggestion 608 and obtains an answer box associated with the suggestion 608. For example, the association engine 606 can maintain an answer box-triggering phrase database that associates answer boxes with the most common triggering phrases for the answer boxes. A triggering phrase for a given answer box is the completion that the answer box is presented in response to. The association engine 606 can determine the most common triggering phrases for each answer box, for example, by analyzing historical data describing how often answer boxes are triggered in response to various queries. The association engine 606 uses this database to select the answer box 504 by identifying a triggering phrase matching the suggestion 608 in the database, and then selecting the answer box associated with the triggering phrase in the database. The database can be updated as new queries trigger the answer boxes, and as new categories of answer boxes are created.

If multiple suggestions 608 are identified, the association engine 606 can select the answer box 504 that is most frequently associated with the suggestions 608, or can select an answer box 504 for each suggestion 608.

Once the association engine 606 selects the answer box 504, the association engine 606 obtains the answer box 504. How the association engine 606 obtains the answer box is dependent on whether the answer box is static or dynamic. Static answer boxes are answer boxes whose content is predetermined. Static answer boxes are stored, for example, in a data storage storing answer boxes. In contrast, dynamic answer boxes are answer boxes whose content is obtained as needed. Some answer boxes can be static at some points in time and dynamic at other points in time. For example, the content in an answer box can be updated according to a regular schedule. When the content needs to be updated, the answer box is a dynamic answer box. However, once the content is updated, the content is cached and the answer box is a static answer box, until the time for the next update.

The association engine 606 obtains static answer boxes from the data storage where they are stored. Obtaining an answer box can include identifying content related to or associated with the completion for presentation along with the completion in the answer box. That content can be static, or dynamic.

When the association engine 606 is obtaining a dynamic answer box, the association engine 606 obtains content associated with the completion or responsive to the category and the parameter of the answer box, for example, according to rules associated with the category of the answer box 504. The association engine 606 can obtain the content (i.e., additional content) from a backend server that manages data for the category of the answer box 504. Alternatively, the association engine can receive the content from a cache that caches content for recently obtained answer boxes. Once the association engine 606 obtains the content, the association engine 606 formats the content according to a template associated with the category of the answer box 504.

User Interface Examples

FIGS. 7A-7D illustrate example controls presented in response to prefixes submitted by a user. The example controls can be obtained, for example, using the techniques described above. In these examples, the additional content items presented along with the suggestions are of the form of advertisements.

Figure 7A:
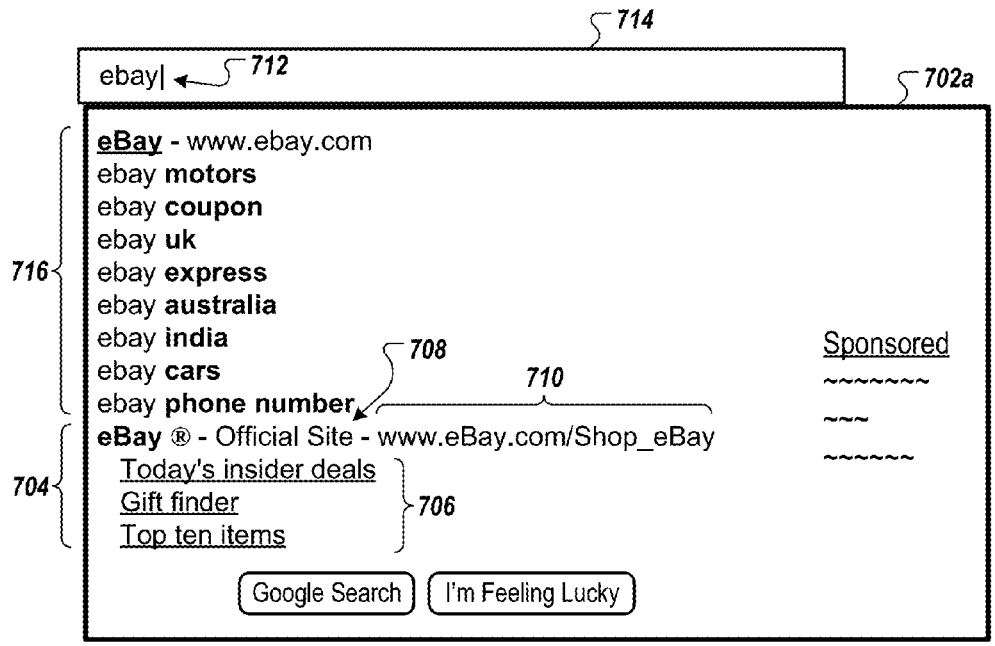
FIGS. 7A-7D illustrate example controls presented in response to user input.

FIG. 7A illustrates an example control 702*a* with ad information presented vertically, having the URL to the right. Specifically, the control 702*a* displays an ad block 704 (e.g., for the official eBay site) with ad links 706 (e.g., "Today's insider deals . . . Gift finder . . . Top ten items") displayed below a site name 708 (e.g., "eBay®—Official Site"). Further, a URL 710 (e.g., www.eBay.com/Shop_e-Bay) corresponding to the site is displayed to the right of the site name 708. The information in the control 702*a* corresponds, for example, to partial text 712 entered in an input box 714. For example, the partial text 712 can be "ebay|" as signified by using the cursor symbol "|" to the right of "ebay" that the user has entered. The partial text 712 can appear, for instance, in the input box 714, such as the search box in the user's browser. Moreover, content suggestions 716 (e.g., ebay motors, ebay UK, ebay coupon, etc.) are displayed in a block above the ad block 704. In some implementations, suggestions (e.g., motors, UK, coupon, etc.) can be distinguished from other text (e.g., the partial text "ebay" or the additional content items) using bolding, italics, colored text, highlighting, or in other ways.

Figure 7B:
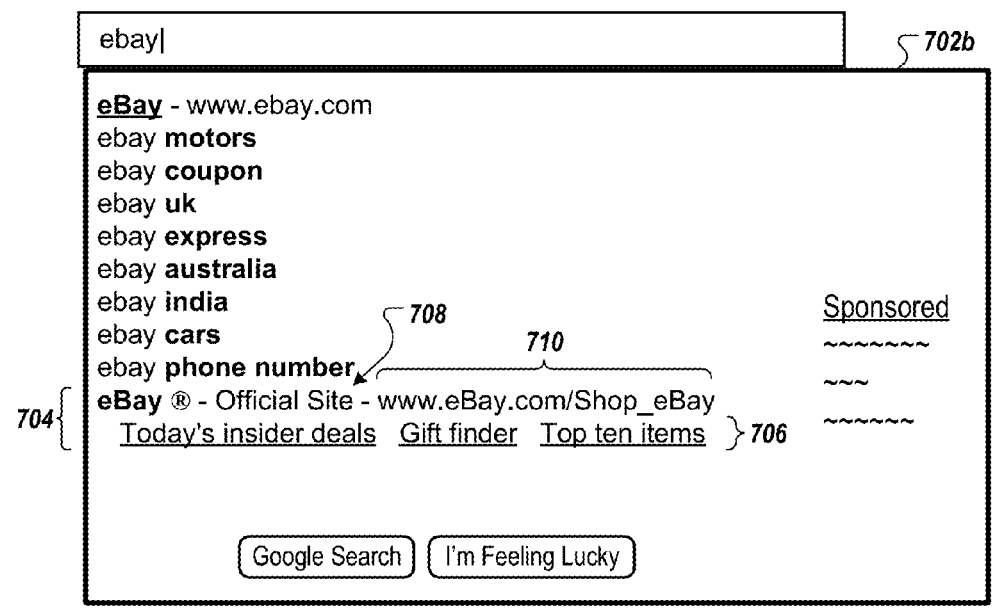

FIG. 7B illustrates an example control 702*b* with ad information presented horizontally, having the URL to the right. In this example, the control 702*b* displays ad links 706 "Today's insider deals . . . Gift finder . . . Top ten items" together on the same line, directly below the site name 708. Further, the URL 710 is displayed to the right of the site name 708, which is identical to the way that it is presented in the control 702*a*. In horizontal displays, such as in the current example, ad links 706 can wrap to multiple lines if not all ad links 706 can fit on a single line. This may occur more frequently, for example, on user devices having narrow screens, such as cell phones, smart phones, PDAs, etc.

Figure 7C:
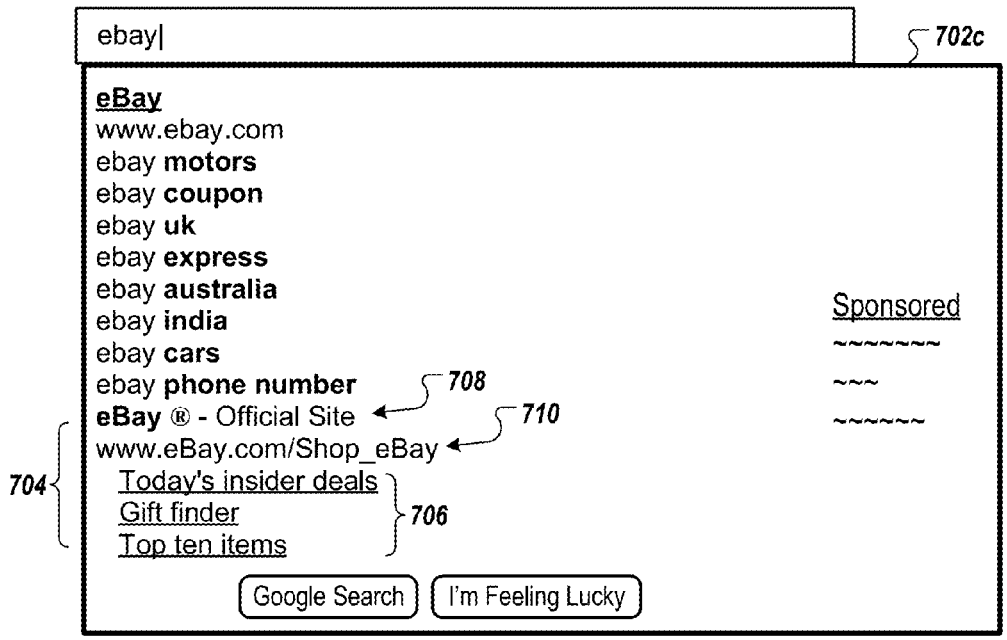

FIG. 7C illustrates an example control 702*c* with ad information presented vertically, having the URL below the site name. Specifically, in this example, the control 702*c* displays ad links 706 "Today's insider deals . . . Gift finder . . . Top ten items" together on separate lines (as is done in FIG. 7A), directly below the site name 708. Further, the URL 710 is displayed below the site name 708, which is different from the way that it is presented in the controls 702*a* and 702*b*.

Figure 7D:
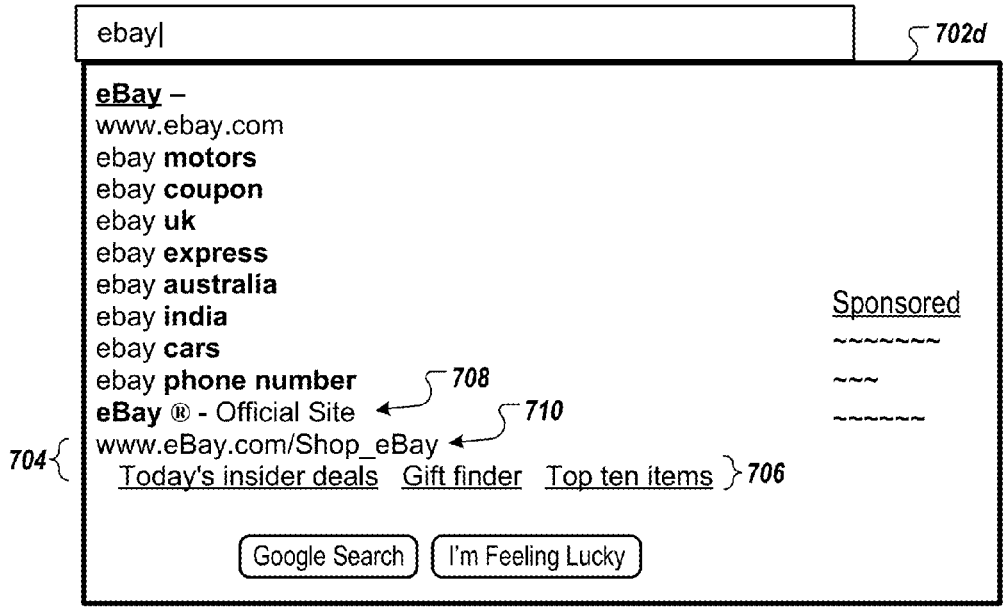

FIG. 7D illustrates an example control 702*d* with ad information presented horizontally, having the URL below the site name. Specifically, in this example, the control 702*d* displays ad links 706 "Today's insider deals . . . Gift finder . . . Top ten items" together on the same line (as is done in FIG. 7B), directly below the site name 708. Further, the URL 710 is displayed below the site name 708, which is the same as the way that it is presented in the control 702*c*.

In some implementations, when the user device (e.g., the client device 104) on which the control is displayed has a small or narrow screen (e.g., on a cell phone, smart phone, PDA, etc.), the information in the control can be formatted accordingly. For example, the browser can know the type of device (and display specifications) of the user computer on which it is running. As a result, on narrow screens, the vertical format depicted in FIG. 7C may be used. In some implementations, other formats not shown in FIGS. 7A-7D can be used. In some implementations, scroll bars or other controls may be included in the control, for example, allowing the user to scroll up and down or left and right. In some implementations, additional controls can exist, such as minus signs or other controls for hiding information.

The appearance of additional content items (e.g., ads) at the top versus the bottom of the control can also change. For example, an ad determined to be a "bull's-eye" or extremely good suggestion can appear at the top of the control, especially when there is just one such ad. Similarly, ads considered less of a match (or less of a good suggestion), especially when there are multiple such ads, can appear at the bottom of the control. Placement of ads in this way, at the top and/or bottom of the control can provide the advantage of presenting more useful information to the user in the right location (e.g., near the top where it will be noticed). This can also avoid cluttering the top of the control with a relatively large number of (or even a few) lesser-quality ads.

Placement of ads and other content items in the control can also depend on the type of control or element. For example, ads or links for videos can be presented in a more prominent location in the control, while content considered less interesting to the user can be displayed less prominently.

In some implementations, content items appearing in the control can be labeled as such (e.g., with an "Advertisement" banner or other indicator). The use of such labels can depend in part on how obvious the content item's identity (as an advertisement versus a non-ad) may be expected to be explicitly known to the user.

In some implementations, a user can select which format to use. For example, users of some home computers may have a preference for a horizontal arrangement of information, while others may favor vertical arrangements. Such preferences can be designated on various options, setup or configuration pages.

In the examples shown, all the suggestions start with the identified prefix (e.g., as shown in FIGS. 7A-7D, all suggestions start with the prefix "ebay,"). In some implementations, suggestions can include the partial term somewhere else in the suggestions. For example, the suggestions can include "great ebay deals" or other suggestions with "ebay" embedded, or even at the end of the suggestion (e.g., "finding great deals on ebay").

FIGS. 7A-7D are examples of a type of control (and a variety of formats) for presenting suggestion and additional content items to a user in response to a user request. Other forms of controls are possible.

In addition to the method 300 described with respect to FIG. 3, other methods can be used for making suggestions and for identifying additional content related to those suggestions, such as in the systems 100, 200 and 400. In some implementations, a method is provided that receives user input in a control associated with a search engine. The user input includes a prefix that, when completed, would form one or more words in a completed search query. While receiving the user input, the prefix is evaluated to make suggestions for completing (i.e., completions) one or more terms in the completed search query. Having identified the completions, identification is made of a likelihood that a particular one of the completions will constitute the completed search query. In some implementations, identification is made of a/one or more content item(s) associated with a/one or more most likely of the one or more completions. Display data associated with the content item can be identified for transmission to the user in response to receiving the user input.

In some implementations, a method is provided that receives user input in a control associated with a webpage. The user input includes a prefix that, when completed, would form a completed user request. While receiving the user input, the prefix is evaluated to make suggestions for completing at least a portion of the request. That is, one or more completions that embody a complete request associated with the prefix can be identified.

Having identified completions, identification is made of one or more content items associated with the completions. Display data associated with the one or more content items can be identified for presentation to the user in response to the request.

In some implementations, a method is provided that receives user input in a control associated with a webpage. The user input includes a prefix that, when completed, would form a completed user request. While receiving the user input, the prefix is evaluated to determine one or more potential completed requests. Identification is made of a content item associated with the prefix and a potential completed request. Display data associated with the prefix can be identified for presentation to the user in an augmented form of the control.

In some implementations, a method is provided that receives a first text input entered in a search engine query input field by a first user. Before the user has submitted the first text input as a search request, a first dominant query is derived from the first text input. The system obtains a content item associated with the first dominant query that has a quality score that is greater than a threshold. The quality score can be associated with the content item, the first dominant query or a combination of the two. The content item and dominant query can be presented in an augmented search engine query input field to the first user.

Figure 8:
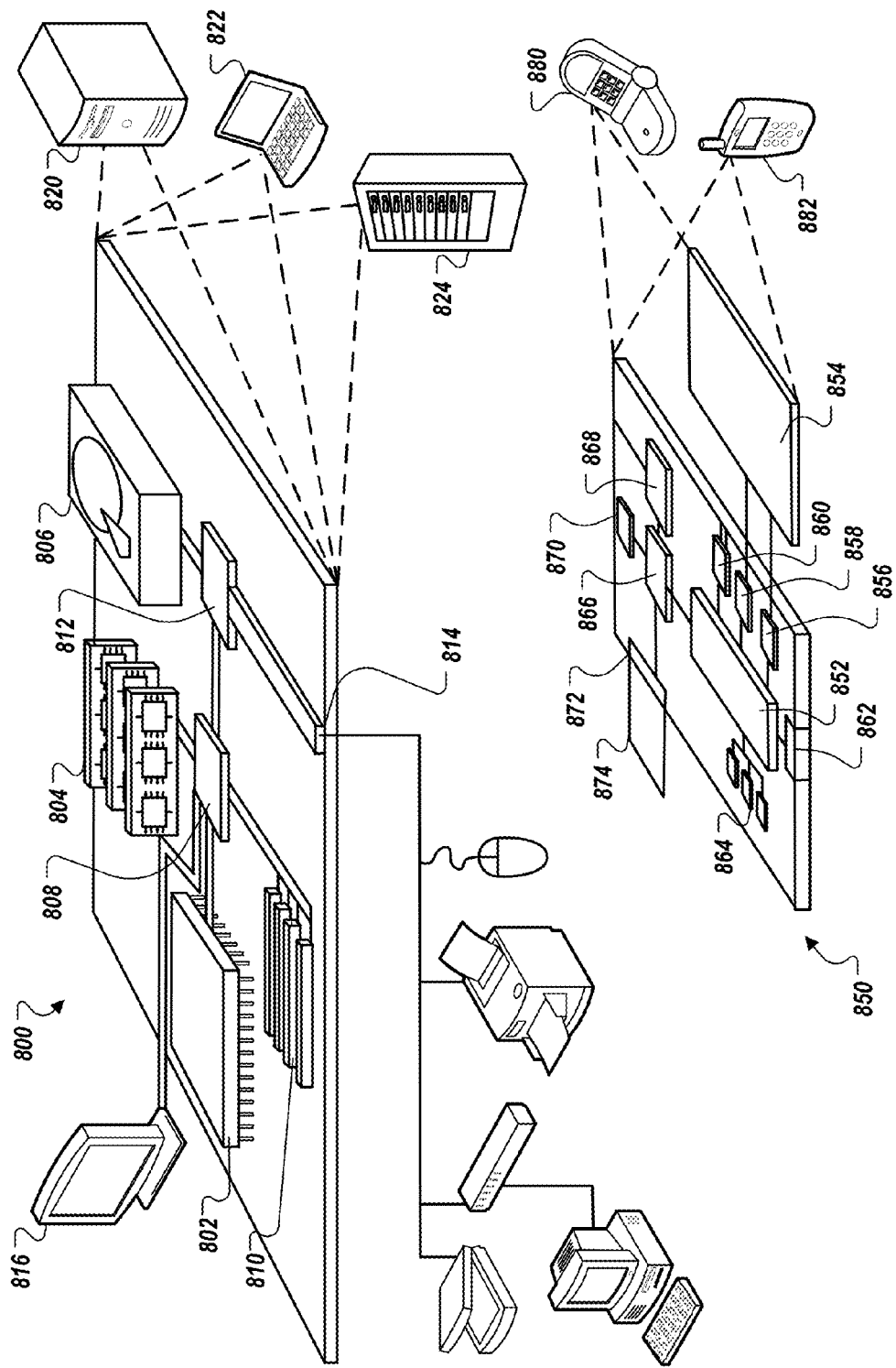
FIG. 8 illustrates an example hardware configuration.

FIG. 8 is a block diagram of computing devices 800, 850 that may be used to implement the systems and methods described in this document, as either a client or as a server or plurality of servers. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a computer-readable medium. In one implementation, the memory 804 is a volatile memory unit or units. In another implementation, the memory 804 is a non-volatile memory unit or units.

The storage device 806 is capable of providing mass storage for the computing device 800. In one implementation, the storage device 806 is a computer-readable medium. In various different implementations, the storage device 806 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 804, the storage device 806, or a memory on processor 802.

The high speed controller 808 manages bandwidth-intensive operations for the computing device 800, while the low speed controller 812 manages lower bandwidth-intensive operations. Such allocation of duties is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can process instructions for execution within the computing device 850, including instructions stored in the memory 864. The processor may also include separate analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD display or an OLED display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication (e.g., via a docking procedure) or for wireless communication (e.g., via Bluetooth or other such technologies).

The memory 864 stores information within the computing device 850. In one implementation, the memory 864 is a computer-readable medium. In one implementation, the memory 864 is a volatile memory unit or units. In another implementation, the memory 864 is a non-volatile memory unit or units. Expansion memory 874 may also be provided and connected to device 850 through expansion interface 872, which may include, for example, a SIMM card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS receiver module 870 may provide additional wireless data to device 850, which may be used as appropriate by applications running on device 850.

Device 850 may also communication audibly using audio codec 860, which may receive spoken information from a user and convert it to usable digital information. Audio codex 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smartphone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

What is claimed is:

1. A method, comprising:
    determining, by one or more data processing apparatus and for a prefix that represents a portion of a search query, one or more completions that yield a completed search query when combined with the prefix, wherein the one or more completions includes a given completion that describes a question;
    receiving, through a search engine input field presented at a user device, user input including the prefix;
    identifying, by one or more data processing apparatus and based on the user input, an answer box for the one or more completions, wherein the answer box includes an answer to the question described by the given completion that is included in the one or more completions; and
    providing, by one or more data processing apparatus and prior to a completed search query being specified by the user input, instructions that cause the answer box to be presented in a display of the user device along with at least some of the one or more completions for which the answer box was identified and the answer to the question described by the given completion, wherein the answer box is a user interface element that presents the one or more completions and the answer to the question described by the given completion while a user enters text input through the search engine input field and before the user submits a search request for the user input.

2. The method of claim 1, further comprising determining that the prefix matches a portion of a first or second search term of the one or more completions.

3. The method of claim 1, wherein determining one or more completions that yield a completed search query when combined with the prefix comprises identifying the one or more completions based, at least in part, on a frequency of previously performed searches that included the one or more completions.

4. The method of claim 1, wherein determining one or more completions that yield a completed search query when combined with the prefix comprises determining a likelihood that a particular one of the one or more completions is being input based, at least in part, on the prefix.

5. The method of claim 1, further comprising providing instructions that cause presentation of a given content item in the answer box.

6. The method of claim 1, wherein providing the instructions that cause the answer box to be presented in the display of the user device comprises providing instructions that cause the user device to present the one or more completions and the answer box to be presented in a drop down menu that appears below the search engine input field.

7. A system, comprising:
    a data storage device; and
    one or more data processing apparatus that interact with the data storage device and execute instructions that cause the one or more data processing apparatus to perform operations comprising:
        determining, for a prefix that represents a portion of a search query, one or more completions that yield a completed search query when combined with the prefix, wherein the one or more completions includes a given completion that describes a question;

receiving, through a search engine input field presented at a user device, user input including the prefix;

identifying, based on the user input, an answer box for the one or more completions, wherein the answer box includes an answer to the question described by the given completion that is included in the one or more completions; and providing, prior to a completed search query being specified by the user input, instructions that cause the answer box to be presented in a display of the user device along with at least some of the one or more completions for which the answer box was identified and the answer to the question described by the given completion, wherein the answer box is a user interface element that presents the one or more completions and the answer to the question described by the given completion while a user enters text input through the search engine input field and before the user submits a search request for the user input.

8. The system of claim 7, wherein the instructions cause the one or more data processing apparatus to perform operations further comprising determining that the prefix matches a portion of a first or second search term of the one or more completions.

9. The system of claim 7, wherein determining one or more completions that yield a completed search query when combined with the prefix comprises identifying the one or more completions based, at least in part, on a frequency of previously performed searches that included the one or more completions.

10. The system of claim 7, wherein determining one or more completions that yield a completed search query when combined with the prefix comprises determining a likelihood that a particular one of the one or more completions is being input based, at least in part, on the prefix.

11. The system of claim 7, wherein the instructions cause the one or more data processing apparatus to perform operations further comprising providing instructions that cause presentation of a given content item in the answer box.

12. The system of claim 7, wherein providing the instructions that cause the answer box to be presented in the display of the user device comprises providing instructions that cause the user device to present the one or more completions and the answer box to be presented in a drop down menu that appears below the search engine input field.

13. A non-transitory computer readable medium storing instructions that, when executed by one or more data processing apparatus, cause the one or more data processing to perform operations comprising:

determining, for a prefix that represents a portion of a search query, one or more completions that yield a completed search query when combined with the prefix, wherein the one or more completions includes a completion that is in the form of a question;

receiving, through a search engine input field presented at a user device, user input including the prefix;

identifying, based on the user input, an answer box for the one or more completions, wherein the answer box includes an answer to the question described by the given completion that is included in the one or more completions; and providing, prior to a completed search query being specified by the user input, instructions that cause the answer box to be presented in a display of the user device along with at least some of the one or more completions for which the answer box was identified and the answer to the question described by the given completion, wherein the answer box is a user interface element that presents the one or more completions and the answer to the question described by the given completion while a user enters text input through the search engine input field and before the user submits a search request for the user input.

14. The non-transitory computer readable medium of claim 13, wherein the instructions cause the one or more data processing apparatus to perform operations further comprising determining that the prefix matches a portion of a first or second search term of the one or more completions.

15. The non-transitory computer readable medium of claim 13, wherein determining one or more completions that yield a completed search query when combined with the prefix comprises identifying the one or more completions based, at least in part, on a frequency of previously performed searches that included the one or more completions.

16. The non-transitory computer readable medium of claim 13, wherein determining one or more completions that yield a completed search query when combined with the prefix comprises determining a likelihood that a particular one of the one or more completions is being input based, at least in part, on the prefix.

17. The non-transitory computer readable medium of claim 13, wherein the instructions cause the one or more data processing apparatus to perform operations further comprising providing instructions that cause presentation of a given content item in the answer box.

* * * * *